(No Model.)

M. L. LISSBERGER.
SASH WEIGHT.

No. 379,317. Patented Mar. 13, 1888.

WITNESSES:
John A. Ellis
C. Sedgwick

INVENTOR:
M. L. Lissberger
BY Munn & Co
ATTORNEYS.

UNITED STATES PATENT OFFICE.

MILTON L. LISSBERGER, OF NEW YORK, N. Y., ASSIGNOR TO THE NEW YORK SMELTING AND REFINING COMPANY, OF SAME PLACE.

SASH-WEIGHT.

SPECIFICATION forming part of Letters Patent No. 379,317, dated March 13, 1888.

Application filed May 4, 1887. Serial No. 237,277. (No model.)

*To all whom it may concern:*

Be it known that I, MILTON L. LISSBERGER, of the city, county, and State of New York, have invented a new and Improved Window-Sash Weight, of which the following is a full, clear, and exact description.

The invention consists of the construction, arrangement, and combination of parts, all as hereinafter described and claimed.

Reference is to be had to the accompanying drawings, forming a part of this specification, in which similar letters of reference indicate corresponding parts in all the figures.

Figure 1:
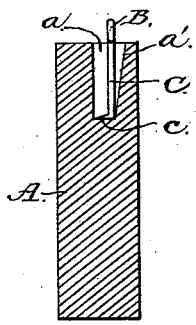
Figure 2:
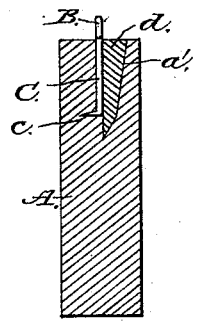

Figure 1 is a sectional elevation of the preferred form of sash-weight, showing the eye-shank inserted in the eye-cavity of the weight, ready to be attached by the insertion of a wedge. Fig. 2 is a sectional elevation, showing the weight complete.

The body of the weight, A, is made of compressed lead and is provided at one end with an eye, B, which forms a part of a shank, C, connected to the body by a lateral connection, $c$, inserted into the body, the eye B being for the purpose of connecting the weight to a sash cord or chain.

The body of the weight is formed with a recess, $a$, inclined at one of its walls, as shown at $a'$, and the shank C is made straight and formed at its lower end with the penetrating point $c$, bent at an angle to the shank C. To secure the shank and eye to the weight, I insert the shank in the recess $a$ and then drive the wedge $d$ into the recess at the back of the shank, the inclined surface of the wedge coming against the inclined wall $a'$. The opposite surface of the wedge is made straight, as shown in Fig. 2, and as the wedge is forced down into the recess $a$ it forces the shank C to one side and embeds the point $c$ in the body of the weight, as shown in Fig. 2, thus firmly securing it in place.

Having thus described my invention, what I claim as new, and desire to secure by Letters Patent, is—

The lead body A of the weight, formed with the recess $a$, beveled upwardly and outwardly at one side, in combination with shank C, formed with the lateral point $c$ at its lower end, and the wedge $d$, made flat at one surface and beveled at the opposite surface and driven into the recess next to the shank, substantially as described.

MILTON L. LISSBERGER.

Witnesses:
 B. SCHUTZ,
 M. LISSBERGER.